UNITED STATES PATENT OFFICE.

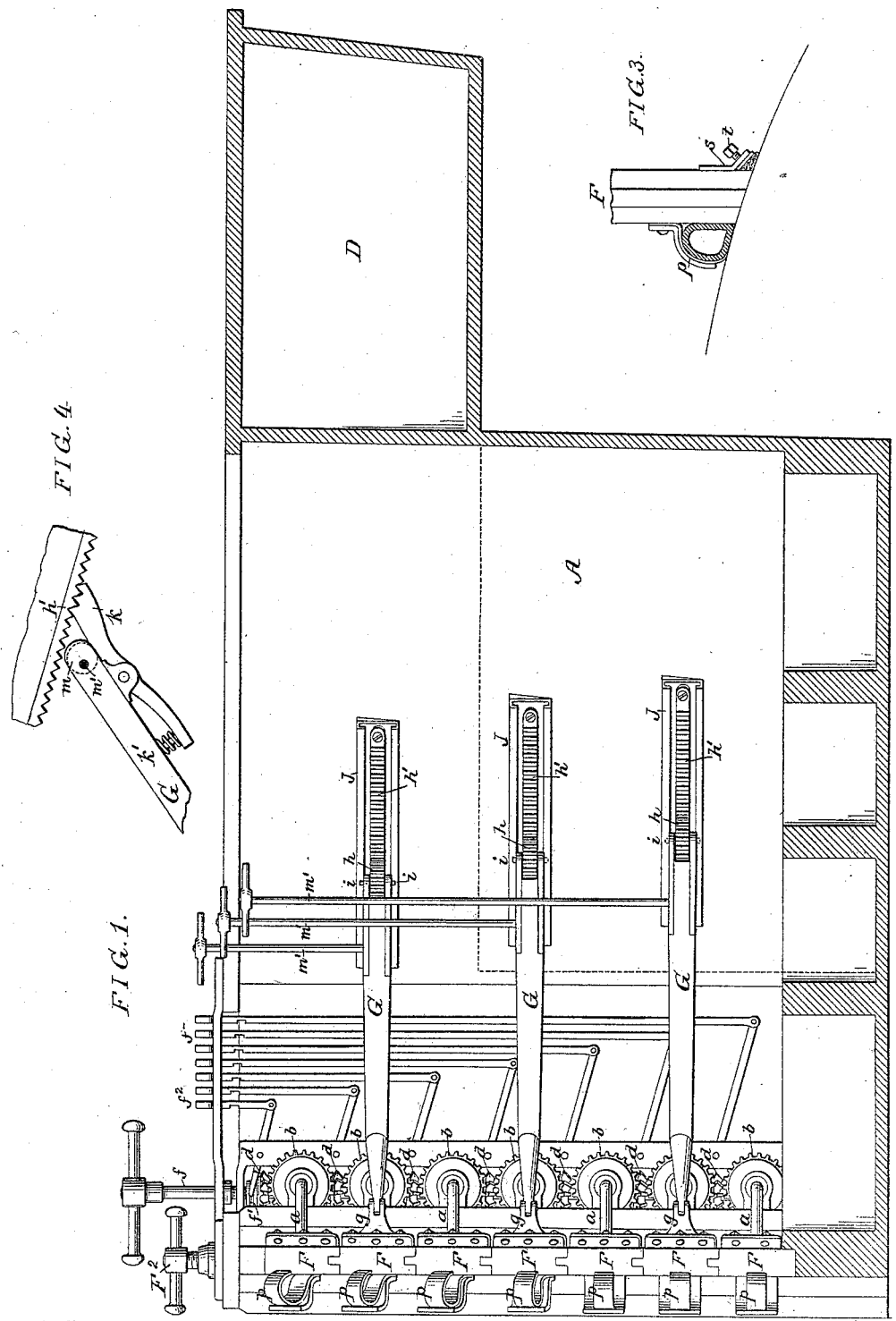

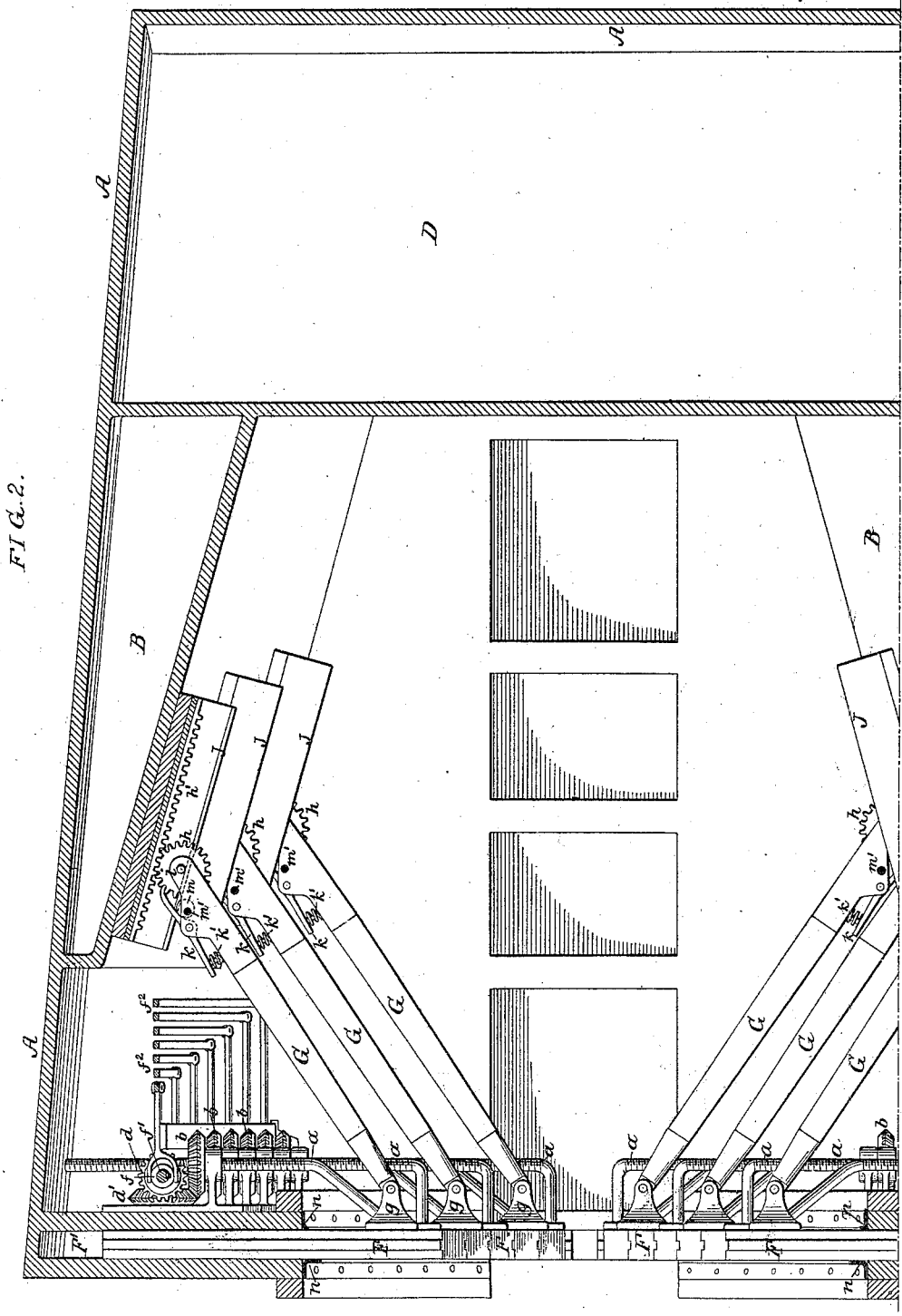

FRANK COX, OF PHILADELPHIA, PENNSYLVANIA.

PORTABLE DRY-DOCK OR COFFER-DAM.

SPECIFICATION forming part of Letters Patent No. 309,030, dated December 9, 1884.

Application filed June 30, 1884. (No model.)

*To all whom it may concern:*

Be it known that I, FRANK COX, a citizen of the United States, and a resident of Philadelphia, Pennsylvania, have invented certain Improvements in Portable Dry-Docks or Coffer-Dams, of which the following is a specification.

My present invention comprises certain improvements in or additions to the portable dry-dock or coffer-dam for which I obtained Letters Patent of the United States, No. 156,542, dated November 3, 1874, one object of my present improvements being to effectually brace, in whatever position they may assume, the slides which close the front end of the dock; a further object being to balance the dock more perfectly than was possible with the former construction, and thus relieve from strain the stays or guys which hold the dock in position on a vessel; and a still further object being to effectually provide against leakage. These objects I attain in the manner hereinafter set forth, reference being had to the accompanying drawings, in which—

Figure 1, Sheet 1, is a longitudinal section of my improved portable dry-dock or coffer-dam; Fig. 2, Sheet 2, a sectional plan view of part of the same, the packing-holders on the inner ends of the slides being omitted in order to more clearly show other features; Fig. 3, a detached section of the inner end of one of the slides with its packing; and Fig. 4 a modification of part of the invention.

A is the casing of the dock, having formed on it the side tanks, B B, and an overhanging stern tank, D, the front end of the dock being furnished with lateral slides F, which are adapted to chambers F' in the front end of the casing, and are provided with screw-rods $a$, adapted to nuts forming the hubs of bevel-wheels $b$, the latter being confined longitudinally to bearings on the casing A, and being driven by pinions $d$ on shafts $f$ through the medium of intervening pinions, $d'$, as in the former patent. Each pinion $d$ is controlled by a clutch, $f'$, operated by a rod, $f^2$, so that as the shaft $f$ is turned each slide may be projected until it bears against the hull of the vessel, the bow or stern of which projects into the dock, the movement of the slide being then arrested without any interference with the movement of the other slides.

It is important that the slides should be braced from the inside of the dock, to prevent the deflection of said slides by the pressure of water outside the same when the dock has been pumped out, and as the position of the slides when closed against the hull of a vessel will vary with the shape of the said hull I provide the slides with automatic braces, which serve to prevent inward deflection, in whatever position the slides may be. In the present instance alternate slides only have these braces; but the slides are provided with tongue-and-groove joints, as shown in Fig. 2, so that the entire series of slides is a unit as regards inward deflection; hence a brace for each slide is unnecessary. It may be used, however, if desired. Each brace consists of a bar, G, pivoted at the outer end to a bracket, $g$, on the slide, and having at the rear end a spur-wheel, $h$, which is adapted to an inclined rack, $h'$, on the inside of one of the side tanks, B, of the dock, projections $i$ (in this case the ends of the spindle of the wheel $h$) being adapted to an inclined guide, J, so that, whatever may be the position of the outer end of the brace, the wheel $h$ will always be kept in gear with the rack $h'$ and will traverse the rack as the outer end of the slide is projected or retracted.

To prevent the inner end of the brace from yielding inwardly, a pawl, $k$, engages with the wheel $h$, this pawl being kept in gear by a spring, $k'$. When it is desired to slacken the brace, however, the pawl can be thrown out of gear by means of an eccentric, $m$, carried by a rod, $m'$. The overhanging stern tank, D, is independent of the side tanks, B, and aids effectively in balancing and maneuvering the dock. For instance, when the side tanks are filled with water and the stern tank empty, the buoyancy of the latter tank will cause the tipping of the dock, so that its front end can be readily introduced beneath the bow or stern of the vessel, and after the dock is in position and has been pumped out the overhanging stern tank may be filled, or partially filled, with water, the weight of which will in a measure counteract the buoying tendency of the water on that portion of the dock which projects beyond the keel of the vessel, a great deal of the strain being thus removed from the braces or shores by which the dock is held in posision. In my patented dock the stern tank projected but little beyond the stern of the dock-casing, but was much deeper than that on the present dock, and in consequence was not as available as the latter for balancing purposes, most of the tank being submerged, so that when filled it had but little effect as a means of weighting the stern of the dock, the weight of the water in the tank being only slightly in excess of the buoying power due to the displacement. The present stern tank is shallow, being confined to the upper portion of the dock-casing, and it projects much farther from the stern of said casing than did the stern tank of the patented dock, so that but little of the tank is submerged when the dock is applied to the vessel. The tongued and grooved joints effectually prevent the leakage of water between the slides F, pressure-screws $F^2$ being used to force the slides firmly together, and on the casing, at the points where the slides enter the chambers $F'$, are aprons $n$, of rubber cloth or like flexible material, which may, if desired, be pressed against the slides by set-screws, as described in the former patent. Rubber tubing should be applied to loops $p$ on the outer sides of the projecting ends of the slides to form a tight joint with the hull, as in the patented dock, and in order to form a joint with the hull on the inner sides of these projecting ends of the slides I provide the same with brackets $s$, which carry set-screws $t$, whereby oakum or other packing material may be pressed into the angle formed by the slides and the hull, as in Fig. 3. Oakum or like packing may also be secured to the outer sides of the slides, so as to aid the rubber tube in forming a tight joint with the hull.

The pinions $h$ are not necessary to the carrying out of my invention, as pawls on the ends of the braces may be adapted directly to racks on the dock-casing, as in Fig. 4.

I claim as my invention—

1. The combination of the dock-casing with the shallow tank D, projecting from the upper portion of the stern of said casing, as set forth.

2. The combination of the dock, its sliding gates, the braces hung to the gates at one end, and means for retaining the opposite ends of the braces, as set forth.

3. The combination of the dock and its sliding gates, with means for compressing packing in the angle formed by said slides and the hull of the vessel, as set forth.

4. The combination of the dock and its racks, the sliding gates, the braces hung thereto, and provided with devices for engaging with the racks, and the guides for maintaining said devices in gear with the racks, as specified.

5. The combination of the dock and its racks, the sliding gates, the braces hung thereto, and having pivoted pawls, guides for said braces, and eccentrics carried by the braces and constructed to act upon the pawls, as set forth.

6. The combination of the dock and its racks, the sliding gates, the braces hung thereto, and having spur-wheels and retaining-pawls therefor, guides for said braces, and eccentrics carried by the braces and constructed to act upon the pawls, as set forth.

In testimony whereof I have signed my name to this specification in the presence of two subscribing witnesses.

FRANK COX.

Witnesses:
   JOHN M. CLAYTON,
   HARRY SMITH.